US008900437B2

(12) United States Patent
Kim et al.

(10) Patent No.: US 8,900,437 B2
(45) Date of Patent: Dec. 2, 2014

(54) APPARATUS AND METHOD FOR FORMING OXIDATION LAYER ON MANIFOLD BLOCK FOR FUEL CELL STACK (75) Inventors: Duck Whan Kim, Seoul (KR); Young Bum Kum, Seoul (KR); Sae Hoon Kim, Gyeonggi-do (KR); Jung Han Yu, Gyeonggi-do (KR); Chang Jun Lee, Gyeonggi-do (KR); Young Hwan Ko, Gyeonggi-do (KR)

(73) Assignees: Hyundai Motor Company, Seoul (KR); Kia Motors Corporation, Seoul (KR); Wooshin Industrial Co., Ltd., Dangjin-Gun, Chungcheongnam-Do (KR)

( * ) Notice: Subject to any disclaimer, the term of this patent is extended or adjusted under 35 U.S.C. 154(b) by 325 days.

(21) Appl. No.: 13/302,233

(22) Filed: Nov. 22, 2011

(65) Prior Publication Data
US 2013/0020205 A1    Jan. 24, 2013

(30) Foreign Application Priority Data

Jul. 20, 2011    (KR) .................... 10-2011-0072180

(51) Int. Cl.
*C25D 11/04* (2006.01)
*C25D 11/00* (2006.01)
*C25D 11/02* (2006.01)
*C25D 21/04* (2006.01)
*C25D 21/10* (2006.01)
*H01M 8/02* (2006.01)

(52) U.S. Cl.
CPC ............ *C25D 11/005* (2013.01); *C25D 11/022* (2013.01); *C25D 21/04* (2013.01); *C25D 21/10* (2013.01); *H01M 8/0228* (2013.01); *Y02E 60/50* (2013.01)
USPC ....................................... 205/324

(58) Field of Classification Search
USPC ................... 205/131, 324–332, 248, 323
See application file for complete search history.

(56) References Cited

U.S. PATENT DOCUMENTS 6,103,076 A * 8/2000 Mizuno .................. 204/286.1
2003/0188972 A1* 10/2003 Shatrov et al. ............ 205/91

FOREIGN PATENT DOCUMENTS

JP    H07-252686    * 10/1995    ............... C25D 5/08
JP    2008218088 A    9/2008
(Continued)

OTHER PUBLICATIONS

KR Patent No. 90-6615, human translation (published 1990).*
JP Patent App. Pub. No. H07-252686, machine translation (published 1995).*

*Primary Examiner* — James Lin
*Assistant Examiner* — Ho-Sung Chung
(74) *Attorney, Agent, or Firm* — Edwards Wildman Palmer LLP; Peter F. Corless (57) ABSTRACT Disclosed is an apparatus and method for forming an oxidation layer on a manifold block for a fuel cell stack, which forms an oxidation layer uniformly over the entire surface of a long and complicated internal flow field of a manifold block. In particular, the apparatus for forming an oxidation layer on a manifold block for a fuel cell stack includes: an electrolyte bath which contains an electrolyte required for the formation of the oxidation layer, an electrode for supplying a required electron flow for the formation of the oxidation layer from a power supply to the manifold block immersed in the electrolyte of the electrolyte bath and to the electrolyte, and an air supply for supplying oxygen to the electrolyte. Even more particularly, the electrode connected to the electrolyte is inserted into each internal flow field of the manifold block to provide an effective electron flow therein.

8 Claims, 6 Drawing Sheets

(56) References Cited

FOREIGN PATENT DOCUMENTS

| JP | 2010153086 A | | 7/2010 | |
| JP | 2010282819 A | | 12/2010 | |
| KR | 10-1988-0010944 B1 | | 9/1990 | |
| KR | 90-6615 | * | 9/1990 | ............ C25D 11/04 |
| KR | 10-2007-0044766 | | 4/2007 | |
| KR | 10-2011-0034335 | | 4/2011 | |

* cited by examiner

FIG.1

PRIOR ART

FIG.2

PRIOR ART

APPARATUS AND METHOD FOR FORMING OXIDATION LAYER ON MANIFOLD BLOCK FOR FUEL CELL STACK

CROSS-REFERENCE TO RELATED APPLICATION

This application claims under 35 U.S.C. §119(a) the benefit of Korean Patent Application No. 10-2011-0072180 filed Jul. 20, 2011, the entire contents of which are incorporated herein by reference.

BACKGROUND (a) Technical Field

The present invention relates to a manifold block for a fuel cell stack. More particularly, it relates to an apparatus and method for forming an oxidation layer on a manifold block for a fuel cell stack, which can form an oxidation layer uniformly over the entire surface of a long and complicated internal flow field of a manifold block.

(b) Background Art

A fuel cell is an electrical generation system that does not convert chemical energy of fuel into heat by combustion, but rather electrochemically converts the chemical energy directly into electrical energy in a fuel cell stack. At present, one of the most attractive fuel cells for a vehicle is a polymer electrolyte membrane fuel cell (PEMFC), which has the highest power density among the fuel cells currently on the market.

The fuel cell stack included in the PEMFC includes a membrane electrode assembly (MEA), a gas diffusion layer (GDL), a gasket, a sealing member, and a separator. The MEA includes a polymer electrolyte membrane through which hydrogen ions are transported. An electrode/catalyst layer, in which an electrochemical reaction takes place, is disposed on each of both sides of the polymer electrolyte membrane. The GDL functions to uniformly diffuse reactant gases and transmit generated electricity. The gasket functions to provide an appropriate airtightness to reactant gases and coolant. The sealing member functions to provide an appropriate bonding pressure. The separator functions to support the MEA and GDL, collect and transmit generated electricity, transmit reactant gases, transmit and remove reaction products, and transmit coolant to remove reaction heat, etc.

A fuel cell stack also includes a manifold block for forming an inlet flow field and an outlet flow field of the fuel cell stack, as a kind of flow field member which allows gas and coolant before and after the reaction to flow in and out of the fuel cell stack. The manifold block has a long and complicated internal flow field through which gas and coolant passes. When a plurality of stack modules are mounted in a fuel cell vehicle, the manifold block attached to the outside of the stack module serves to uniformly supply reactant gases (air and hydrogen) and coolant to each stack module.

To manufacture such a manifold block, a method for manufacturing the manifold block using an aluminum casting process and forming an oxidation layer for improving corrosion resistance on external and internal flow fields of the manifold block has been used. In such a method, the oxidation layer may be formed by plasma electrolytic oxidation (PEO) or anodizing, in which the die-cast manifold block is immersed in an electrolyte made of an inorganic material as a main ingredient. Electricity is then applied thereto, thus electrochemically forming the oxidation layer.

Figure 1:
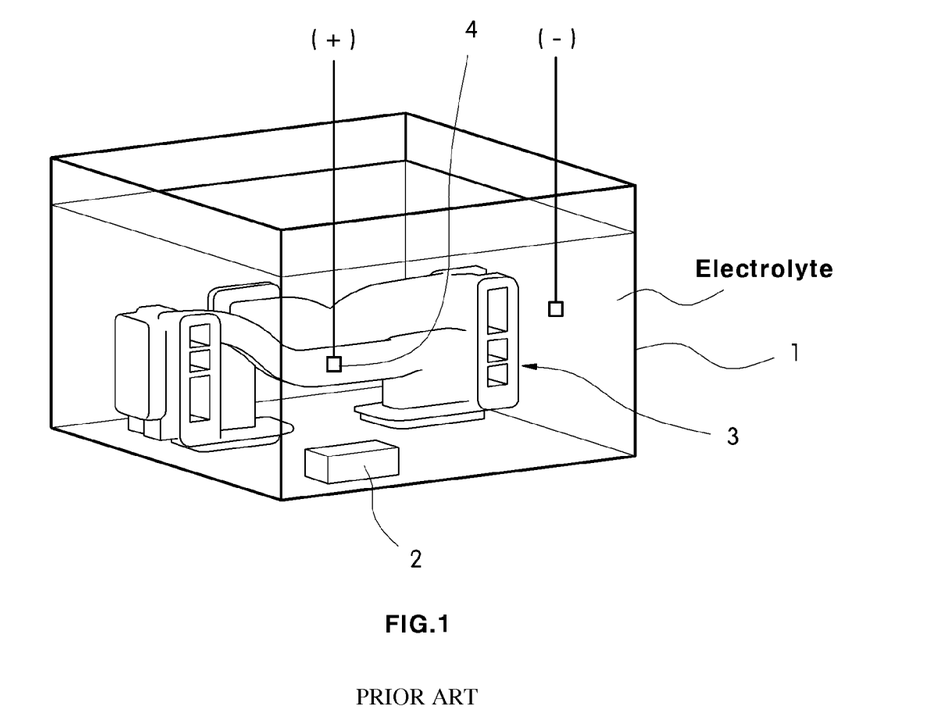
FIG. 1 is a schematic diagram showing the configuration of a conventional apparatus for forming an oxidation layer.

Referring to FIG. 1, after a manifold block 3 is located in an electrolyte bath 1 containing an electrolyte, a positive electrode is connected to the manifold block 3, a negative (−) electrode 5 is connected to electrolyte, a positive (+) electrode 4 is connected to the manifold block 3, and oxygen (air) is supplied to the electrolyte, thereby forming an oxidation layer on the surface of the manifold block 3. Here, a bubble generator 2 generates bubbles in the electrolyte bath 1 so that a sufficient amount of oxygen, which is required for the formation of the manifold block, can be supplied. This bubble generator, accordingly, supplies a large amount of oxygen to the electrolyte through the generated bubbles.

However, according to such a conventional method, while the oxidation layer can be easily formed on the outside of the manifold block and at the inlet of the internal flow field, it is very difficult to supply the power required for formation of the oxidation layer to the inside of the internal flow field. That is, it is necessary to supply sufficient oxygen required for the oxidation reaction so as to uniformly form the oxidation layer over the entire surface of the internal flow field. However, even when the bubbles are generated by the bubble generator provided in the electrolyte bath, sufficient oxygen is currently not supplied to the inside of the internal flow field. Accordingly, when the oxygen present in the electrolyte of the internal flow field is exhausted as the formation of the oxidation layer proceeds, the oxidation layer is no longer formed, which makes it very difficult to form the oxidation layer on the inside of the internal flow field. Thus, only the inlet of the internal flow field forms an oxidation layer in the conventional method.

Figure 2:
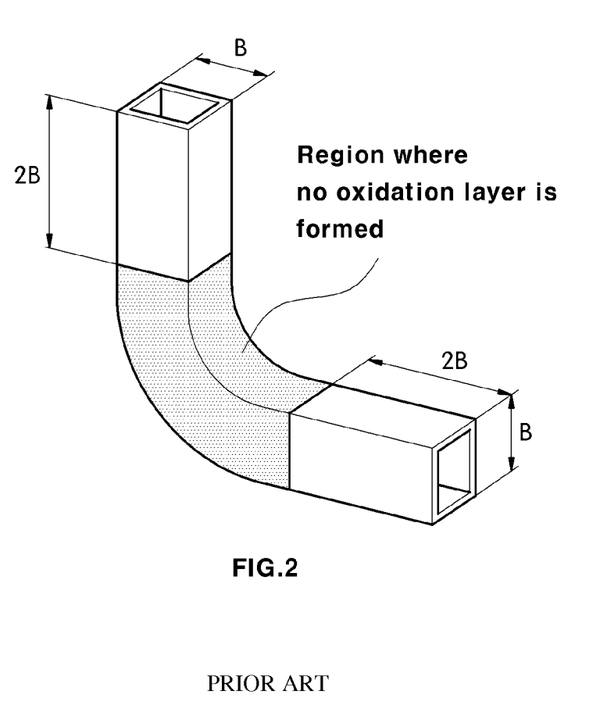
FIG. 2 is a schematic diagram illustrating a problem of a region where no oxidation layer is formed.

FIG. 2 is a schematic diagram illustrating a region where no oxidation layer is formed. Referring to FIG. 2, while the oxidation layer can be formed with a length of about two times the inlet width B of the flow field, the oxidation layer is not formed in the other region (L−(2×B+2×B)). As such, the oxidation layer is not formed uniformly over the entire surface of the long and complicated internal flow field of the manifold block. Thus, this issue needs to be address in order to provide sufficient oxidation on the manifold block.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides an apparatus and method for forming an oxidation layer on a manifold block for a fuel cell stack, which forms an oxidation layer uniformly over the entire surface of a long and complicated internal flow field of a manifold block.

In one aspect, the present invention provides an apparatus for forming an oxidation layer on a manifold block, the apparatus comprising: an electrolyte bath containing an electrolyte required for the formation of the oxidation layer; an electrode for supplying power required for the formation of the oxidation layer from a power supply to the manifold block immersed in the electrolyte of the electrolyte batch and to the electrolyte; and an oxygen supply for supplying oxygen to the electrolyte, wherein the electrode connected to the electrolyte comprises an electrode inserted into each internal flow field of the manifold block.

In an exemplary embodiment, the electrode inserted into each internal flow field of the manifold block may be coated with an insulating layer or tube, the insulating layer or tube comprising an aperture for providing an electrical connection between the electrode within the insulating tube and the electrolyte filled in the internal flow field. In some embodiments, the aperture of the insulating layer or tube may be made up of a plurality of apertures disposed in the longitudinal direction of the insulating tube.

In still other embodiments, the oxygen supply may include a nozzle disposed in each internal flow field of the manifold block. This nozzle may be configured to receive the electrolyte mixed with air and containing bubbles and supply the bubble-containing electrolyte to each internal flow field.

In yet another embodiment, the oxygen supply may comprise: a pump for pumping the electrolyte and supplying the electrolyte through an electrolyte supply pipe; an air supply device for supplying air through an air supply pipe; a mixing chamber connected to the electrolyte supply pipe and the air supply pipe, and mixes the electrolyte supplied by the pump and the air supplied by the air supply device; and a nozzle for receiving the electrolyte mixed with air and containing bubbles from the mixing chamber through a bubble supply pipe and supplying the bubble-containing electrolyte to each internal flow field of the manifold block.

In still yet another embodiment, the apparatus of the present invention may further comprise a jig provided in the electrolyte bath which fixes the manifold block. In particular, the mixing chamber and the nozzles are fixedly mounted in a predetermined position of the jig such the bubble-containing electrolyte can be supplied to each internal flow field of the manifold block fixed to the jig.

In another aspect, the present invention provides a method for forming an oxidation layer on a manifold block, the method comprising: positioning the manifold block in an electrolyte bath containing an electrolyte required for the formation of the oxidation layer; supplying oxygen from an air supply device to the electrolyte; supplying power required for the formation of the oxidation layer from a power supply to the manifold block and the electrolyte; and inserting an electrode connected to the electrolyte into each internal flow field of the manifold block to allow the power to be supplied to the electrolyte filled in the internal flow field.

In some embodiments, the electrode inserted into each internal flow field of the manifold block may be coated with an insulating tube or layer, the insulating tube or layer may be an aperture for providing an electrical connection between the electrode within the insulating tube or layer and the electrolyte filled in the internal flow field.

In another embodiment, in order to supply oxygen from the air supply device to the electrolyte, a nozzle of the air supply device may be disposed in each internal flow field of the manifold block such that the electrolyte mixed with air and containing bubbles can be supplied to the internal flow field through each nozzle.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Reference numerals set forth in the Drawings includes reference to the following elements as further discussed below:

1: electrolyte bath
  2: bubble generator
  3: manifold block
  4: electrode (+)
  5: electrode (−)
  5$a$: insulating tube
  5$b$: aperture
  8: jig
  9: support
  9$a$: electrode inserting portion
  11: pump
  11$a$: electrolyte supply pipe
  12: air supply device
  12$a$: air supply pipe
  13: mixing chamber
  14: bubble supply pipe
  15: outlet of bubble supply pipe It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The present invention provides an apparatus and method for forming an oxidation layer which improves corrosion resistance on a manifold block. The apparatus and method for forming the oxidation layer according to the present invention is characterized by using an electrode which is inserted into each long internal flow field of the manifold block and an air supply device for supplying oxygen into each internal flow field, thereby allowing the formation of an oxidation layer uniformly over the entire surface of a long and complicated internal flow field of the manifold block.

Figure 3:
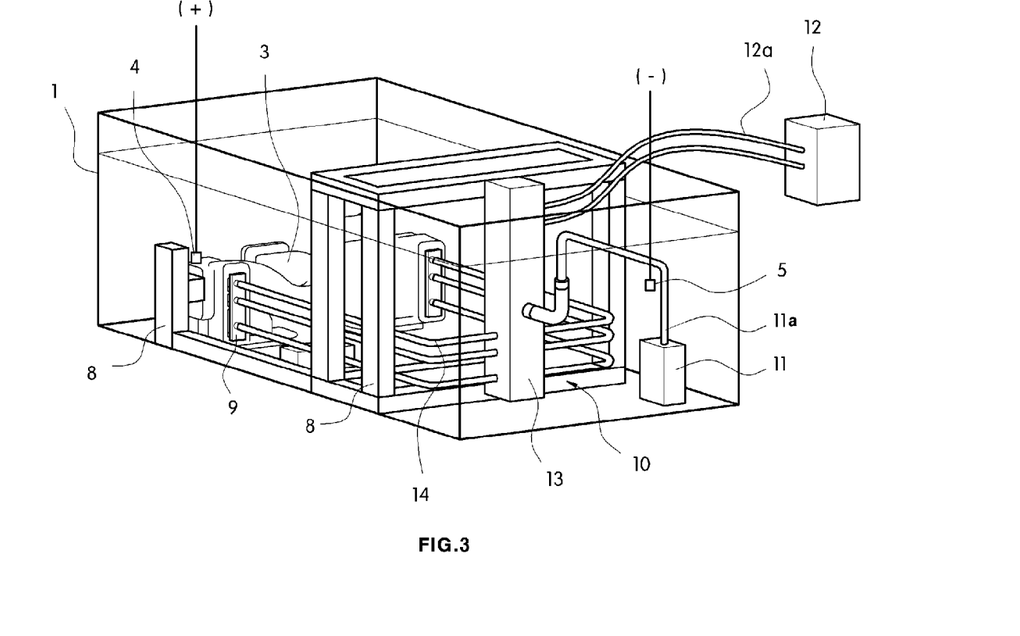
FIG. 3 is a schematic diagram showing the configuration of an apparatus for forming an oxidation layer in accordance with an exemplary embodiment of the present invention.
Figure 4:
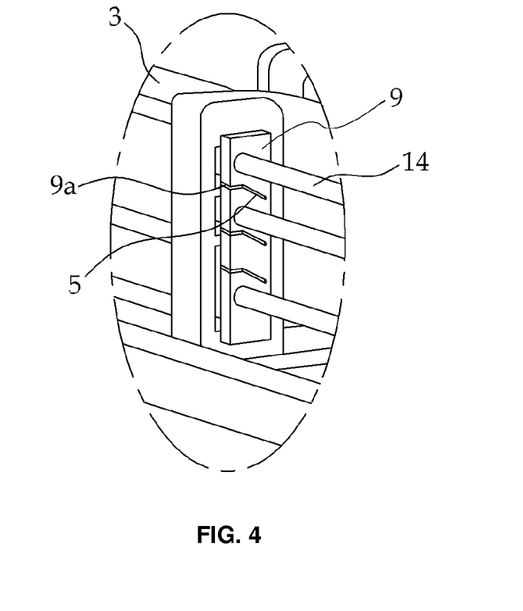
FIG. 4 is an enlarged view showing an apparatus for forming an oxidation layer in accordance with the exemplary embodiment of the present invention, in a state where a support and a bubble supply pipe are provided.
Figure 5:
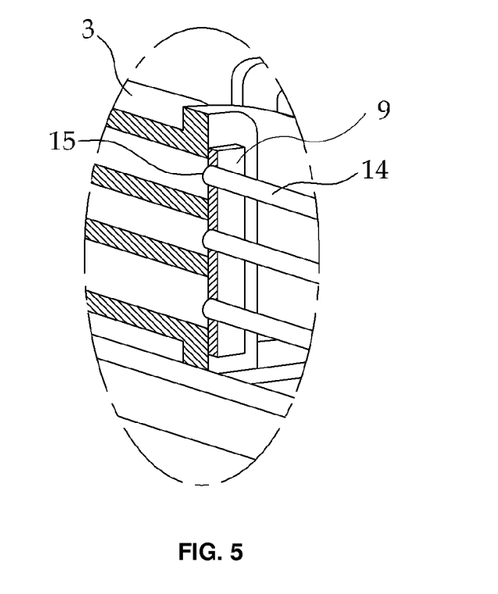
FIG. 5 is a perspective view showing a cross-sectional view of a manifold block and a support taken from the enlarged view in FIG. 4 in accordance with the exemplary embodiment of the present invention.
Figure 6:
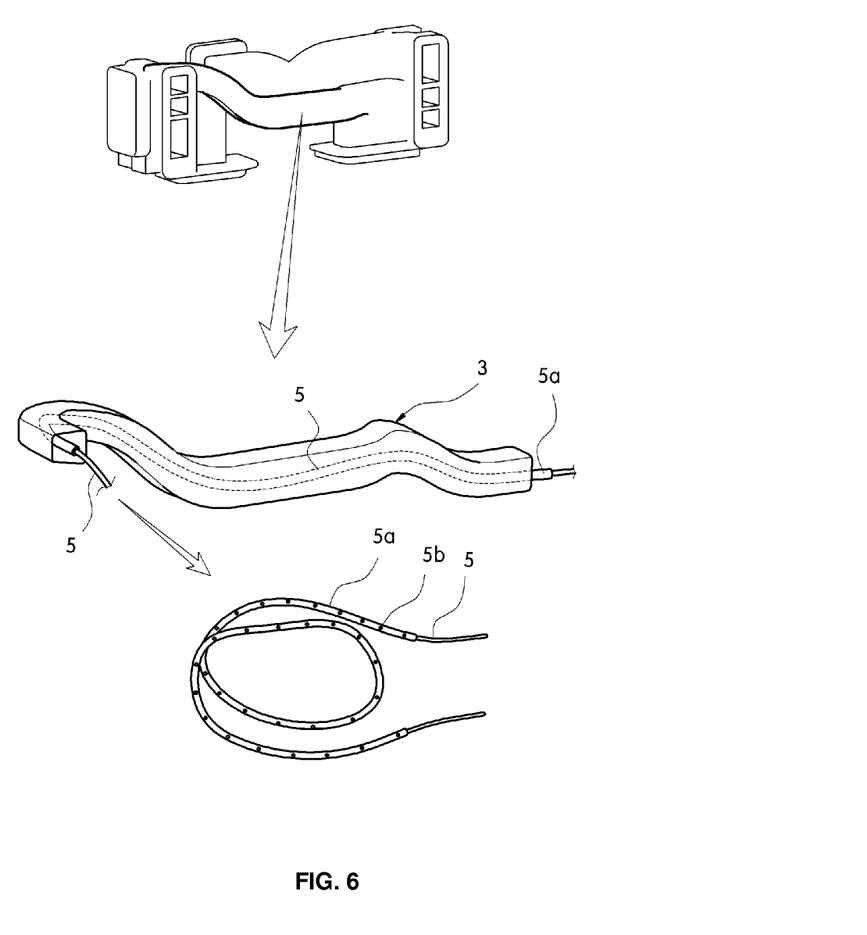
FIG. 6 is a perspective view showing an electrode inserted into an internal flow field in an apparatus for forming an oxidation layer in accordance with the exemplary embodiment of the present invention and showing a state where the electrode is inserted into the internal flow field of a manifold block.

FIG. 3 is a schematic diagram showing the configuration of an apparatus for forming an oxidation layer in accordance with an exemplary embodiment of the present invention, FIG. 4 is an enlarged view showing an apparatus for forming an oxidation layer in accordance with the exemplary embodiment of the present invention, in a state where a support and a bubble supply pipe are provided; FIG. 5 is a perspective view showing a cross-sectional view of a manifold block and a support taken from the enlarged view in FIG. 4 in accordance with the exemplary embodiment of the present invention; and FIG. 6 is a perspective view showing an electrode inserted into an internal flow field in an apparatus for forming an oxidation layer in accordance with the exemplary embodiment of the present invention and showing a state where the electrode is inserted into the internal flow field of a manifold block.

First, referring to FIG. 3, the apparatus for forming the oxidation layer includes an electrolyte bath 1 containing an electrolyte required for the formation of the oxidation layer, a manifold block 3 immersed in an electrolyte of the electrolyte bath 1, electrodes 4 and 5 for supplying an electron flow (current) required for the formation of the oxidation layer to the electrolyte, and an air supply device 10 for supplying oxygen (air) to the electrolyte. Here, an external power supply (not shown) is connected to the electrodes 4 and 5 such that a current required for oxidation/reduction reactions is supplied from the power supply to the electrodes 4 and 5. When a current is applied to the electrodes 4 and 5, an oxidation layer can be formed on the surface of the manifold block 3 (e.g., made of aluminum) by a typical electrochemical reaction for the formation of the oxidation layer.

In the apparatus for forming the oxidation layer, a positive electrode 4 is connected to the manifold block in which the oxidation layer is to be formed, and a negative electrode 5 is connected to the electrolyte. If a negative potential is applied to the electrode which is simply inserted into the electrolyte in a conventional manner, a sufficient negative potential is not applied to the electrolyte within the long internal flow field of the manifold block 3, and thus the oxidation layer is not formed. Accordingly, a negative electrode (for applying a negative potential to the electrolyte) in the present invention is inserted into each internal flow field of the manifold block 3 is further used to supply a sufficient electron flow for the formation of the oxidation layer to the electrolyte in the internal flow field.

As shown in FIG. 4, the electrode 5 inserted into the internal flow field may be formed into a shape that can be inserted into the long internal flow field. Since the internal flow field of manifold block 3 typically has a curved shape, the electrode 5 may be in the form of a flexible wire so that it can be inserted into the curved flow field accordingly. If the electrode 5 made of a conductive material were to be inserted into the internal flow field of the manifold block 3 as is, the negative electrode 5 and the manifold block 3 are short circuited, thereby causes damage to the manifold block 3 and preventing the oxidation reaction from occurring.

To rectify this, the electrode 5 is coated with an insulating tube or layer 5a to provide electrical insulation, and a plurality of apertures 5b are formed in the insulating tube/layer 5a to provide an electrical connection between the electrode 5 within the insulating tube 5a and the electrolyte on the outside of the manifold block 3.

The apertures 5b may be formed with a predetermined pattern and disposed at regular intervals in the longitudinal direction of the insulating tube/layer 5a. Here, the apertures 5b may have any suitable shape such as a circular, rectangular, or star shape, and the size and number of the apertures 5b may be determined in terms of the depth of the oxidation layer to be formed on the manifold block 3.

As such, after the manifold block 3 is located in the electrolyte bath 1 containing the electrolyte, the negative electrode 4 coated with the insulating tube 5a is inserted into the internal flow field of the manifold block 3 as shown in FIG. 4. Then, a current is supplied from the power supply to the electrolyte using the positive electrode 4 connected to the negative electrode 5 and the manifold block 3, thereby forming the oxidation layer on the surface of the manifold block 3. In particularly, the oxidation layer is uniformly formed over the entire surface of the internal flow field by the electrode 4 inserted into each internal flow field, thereby an oxidation layer to be uniformly formed on the inside of the internal flow field of the manifold block.

Moreover, in the present invention, the above-described elongated wire-shaped electrode 4 is inserted into each internal flow field of the manifold block 3 and, at the same time, the negative electrode (denoted by reference numeral 5 in FIG. 3) is inserted into the electrolyte on the outside of the manifold block 3 to supply power, thereby forming the oxidation layer uniformly over the entire surface of the outside of the manifold block 3 and the inside of the internal flow field.

Next, the configuration of the air supply device for supplying oxygen (air) to the electrolyte according to the present invention will be described.

The oxygen supply device 10 may be configured to supply a sufficient amount of oxygen required for the formation of the oxidation layer to each internal flow field of the manifold block 3 so that oxygen-containing bubbles is supplied to each internal flow field of the manifold block 3 through each nozzle, thereby forming the oxidation layer efficiently over the entire surface of the internal flow field. That is, a plurality of nozzles, each supplying oxygen-containing bubbles to each internal flow field of the manifold block 3, are provided in the electrolyte bath 1. Suitably, the oxygen supply device 10 may be configured to mix the electrolyte with air and supply bubble-containing electrolyte to each internal flow field through each nozzle.

In more detail, as shown in FIG. 3, a jig(s) 8 for fixing the manifold block 3 are installed in the electrolyte bath 1, and the plurality of nozzles are disposed adjacent to an inlet of each internal flow field of the manifold block 3 fixed to the jig 8. Each of the nozzles are mounted on a support 9 integrally formed as part of the jig 8, and an outlet of each nozzle is disposed to face the inside of each internal flow field such that the bubble-containing electrolyte can be supplied from the support 9 to the inside of the internal flow field.

Moreover, a pump 11 for pumping the electrolyte is disposed in the electrolyte bath 1, a mixing chamber 13 is installed on the jig 8, and an electrolyte supply pipe 11a is connected between the pump 11 and the mixing chamber 13 such that the electrolyte pumped through the electrolyte supply line 11a by the pump 11 can be supplied to the mixing chamber 13. An air supply pipe 12a is connected from the air supply device 12 on the outside of the electrolyte bath 1 to the mixing chamber 13 so that the air can be supplied from the air supply device 12 to the mixing chamber 13 through the air supply pipe 12a. Further, a bubble supply pipe 14 is connected from the mixing chamber 13 to each nozzle.

As a result, during the formation of the oxidation layer, the electrolyte pumped by the pump 11 and the air supplied from the air supply device 12 are mixed together in the mixing chamber 13, and the mixture of the electrolyte and air, i.e., the bubble-containing electrolyte, can be supplied to each internal flow field through the bubble supply pipe 14 and the nozzle. As such, while the oxygen-containing bubbles are being supplied to the internal flow field through each nozzle, a current is supplied to the electrolyte through the electrodes 4 and 5, thereby forming the oxidation layer uniformly over the entire surface of the internal flow filed regardless of the length and shape of the internal flow field.

Moreover, in the apparatus for forming the oxidation layer according to the present invention, the mixing chamber 13 and the plurality of nozzles may be mounted in a predetermined position, orientation or shape in the jig 8 to be integrated therewith. In this case, once the manifold block 3 is mounted in a predetermined position of the jig 8 in the electrolyte bath 1, the process can be immediately performed without additional installation, thereby increasing productivity.

Further, the size of the nozzle outlet, the flow rates of the pump and the air supply device, the size of the chamber, etc., may be determined based on the shape and length of the internal flow field such that an appropriate amount of electrolyte (i.e., bubble-containing electrolyte) is supplied to the internal flow field of the manifold block 3 through the nozzle, and a nozzle capable of controlling the amount of electrolyte injected may be used. In addition, the position and direction of each nozzle may be appropriately determined based on the position and shape of the internal flow field such that once the manifold block 3 is mounted on the jig 8, the bubble-containing electrolyte can be supplied to each internal flow field.

Nozzles may be provided in support 9, wherein each nozzle is connected to each bubble supply pipe 14 thereby allowing the bubble-containing electrolyte to be introduced into the internal flow field of the manifold block 3 through the nozzles. Alternatively, as shown in FIG. 5, each bubble supply pipe 14 may be installed to pass through the support 9 thereby allowing the bubble supply pipe outlet 15 to serve as a nozzle.

FIG. 5 shows how each bubble supply pipe 14 is configured to pass through the support 9 so that the bubble supply pipe outlet 15 can serve as a nozzle to spray bubble-containing electrolyte.

As described above, according to the apparatus and method for forming the oxidation layer on the manifold block for the fuel cell stack of the present invention, with the use of the electrode which is inserted into each long internal flow field of the manifold block and the air supply device for supplying oxygen to each internal flow field, it is possible to supply a sufficient amount of electron flow and oxygen required for the formation of the oxidation layer to the long and complicated internal flow field of the manifold block, thereby forming the oxidation layer uniformly over the entire surface of the internal flow field.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An apparatus for forming an oxidation layer on a manifold block for a fuel cell stack, the apparatus comprising:
   an electrolyte bath containing an electrolyte required for the formation of the oxidation layer;
   a plurality of flexible electrodes for supplying a required electron flow for the formation of the oxidation layer from a power supply to the manifold block immersed in the electrolyte of the electrolyte batch and to the electrolyte; and
   an air supply system for supplying oxygen to the electrolyte,
   wherein at least one electrode is configured to be inserted into each internal flow field of the manifold block,
   wherein the air supply device further comprises a nozzle disposed in each internal flow field of the manifold block, the nozzle configured to receive at its inlet the electrolyte mixed with air and containing bubbles and supply at its outlet the bubble-containing electrolyte to each internal flow field,
   wherein the at least one electrode inserted into each internal flow field of the manifold block is coated with an insulating layer, the insulating layer comprising an aperture for providing an electrical connection between the electrode within the insulating layer and the electrolyte filled in the internal flow field,
   wherein the insulating layer is coated directly on the at least one electrode along the entire length of the insulating layer.

2. The apparatus of claim 1, wherein the aperture of the insulating layer comprises a plurality of apertures disposed in the longitudinal direction of the insulating layer.

3. The apparatus of claim 1, wherein the air supply system further comprises:
   a pump for pumping the electrolyte and supplying the electrolyte through an electrolyte supply pipe to the internal flow field of the manifold block;
   an air supply device for supplying air through an air supply pipe; and
   a mixing chamber connected to the electrolyte supply pipe and the air supply pipe, and configured to mix the electrolyte supplied by the pump and the air supplied by the air supply device.

4. The apparatus of claim 3, further comprising a jig provided in the electrolyte bath and configured to fix the manifold block within the electrolyte bath, wherein the mixing chamber and the nozzles are fixedly mounted in a predetermined position of the jig so that the bubble-containing electrolyte is supplied to each internal flow field of the manifold block fixed to the jig.

5. An apparatus comprising:
   an electrolyte bath containing an electrolyte required for the formation of the oxidation layer on a manifold block of a fuel cell stack;
   a positive flexible electrode surrounded by an insulating layer configured to be inserted into each internal flow field of the manifold block;
   a negative electrode disposed in the electrolyte outside of the internal flow field of the manifold block; and
   an air supply system for supplying oxygen to the electrolyte,
   wherein the electrodes are configured to supply a required electron flow the electrolyte to form a uniform oxidation layer on the surface of the manifold block, wherein the air supply device further comprises a nozzle disposed in the inlet of each internal flow field of the manifold block, the nozzle configured to receive at its inlet the electrolyte mixed with air and containing bubbles and supply at its outlet the bubble-containing electrolyte to each internal flow field, wherein the insulating layer is coated directly on the at least one electrode along the entire length of the insulating layer.

6. The apparatus of claim 5, wherein the insulating layer further comprises an aperture for providing an electrical connection between the electrode within the insulating layer and the electrolyte filled in the internal flow field.

7. The apparatus of claim 5, wherein the insulating layer further comprises a plurality of apertures disposed in the longitudinal direction of the insulating layer for providing an electrical connection between the electrode within the insulating layer and the electrolyte filled in the internal flow field.

8. The apparatus of claim 5, wherein the air supply system further comprises:
- a pump for pumping the electrolyte and supplying the electrolyte through an electrolyte supply pipe to the internal flow field of the manifold block;
- an air supply device for supplying air through an air supply pipe;
- a mixing chamber connected to the electrolyte supply pipe and the air supply pipe, and configured to mix the electrolyte supplied by the pump and the air supplied by the air supply device.

* * * * *